(12) United States Patent
Kang

(10) Patent No.: US 6,597,644 B1
(45) Date of Patent: Jul. 22, 2003

(54) METHOD AND APPARATUS FOR SLIDING AN OPTICAL PICKUP

(75) Inventor: Byung Gyoo Kang, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 249 days.

(21) Appl. No.: 09/661,782

(22) Filed: Sep. 14, 2000

(30) Foreign Application Priority Data

Sep. 14, 2000 (KR) ......................................... 1999-39418

(51) Int. Cl.$^7$ ................................................. G11B 7/00
(52) U.S. Cl. ................................................. 369/44.35
(58) Field of Search .......................... 369/44.32, 44.35, 369/44.36, 44.25, 53.19, 53.35, 53.12

(56) References Cited

U.S. PATENT DOCUMENTS

| | | | | |
|---|---|---|---|---|
| 5,014,256 A | * | 5/1991 | Horie et al. | 369/44.35 |
| 5,481,526 A | * | 1/1996 | Nagata et al. | 369/44.35 |
| 5,757,747 A | * | 5/1998 | Shimada | 369/44.25 |
| 6,137,758 A | * | 10/2000 | Nemoto | 369/44.35 |

* cited by examiner

Primary Examiner—Thang V. Tran
(74) Attorney, Agent, or Firm—Birch, Stewart, Kolasch & Birch, LLP.

(57) ABSTRACT

The present invention relates to method and apparatus for controlling the slide of an optical pickup installed in the optical disk device so that deviation of an optical lens from an optical axis may be corrected. The corrective action is taken when the deviation reaches or is beyond a predetermined range. The predetermined is narrower than the maximum movable range of the optical lens. Also the corrective action is accomplished by adjusting either the DC component or the overall bandwidth of the servo gain loop depending on whether the rotational rate of an optical disk is high or low. Such method prevents or minimizes object lens from over-shifting or freely oscillating.

22 Claims, 5 Drawing Sheets

Deviation Error Signal

*Conventional Art*

*Conventional Art*

METHOD AND APPARATUS FOR SLIDING AN OPTICAL PICKUP

BACKGROUND OF THE INVENTION

The present invention relates to method and apparatus for controlling the slide of an optical pickup equipped in an optical disk device.

A conventional optical disk device is shown in FIG. 1. The device reproduces signals recorded on an optical disk 1 through an optical pickup 2, a R/F unit 3, a digital signal processing unit 4, and a decoder 5.

The optical pickup 2 reproduces recorded signals from an optical disk 1; the R/F unit 3 combines signals reproduced by the optical pickup 2 and outputs servo error signals (discussed below) and binary signals; the digital signal processing unit 4 processes the binary signals received from the R/F unit 3 to retrieve digital data; and the decoder 5 decodes the retrieved digital data into original data.

The optical disk device also tracks data on the optical disk 1 by controlling a sled motor 10 and a spindle motor 11. The sled motor 10 slides the optical pickup 2 across tracks of the optical disk 1 and the spindle motor 11 rotates the optical disk 1.

The control is accomplished through the R/F unit 3, a servo unit 6, and a driver 7. As mentioned above, the R/F unit 3 outputs servo error signals. The servo unit 6 receives the servo error signals from the R/F unit 3 and outputs servo control signals to the driver 7. The driver 7 in turn outputs signals to control the sled motor 10 and the spindle motor 11.

The entire operation is supervised by the microcomputer 8. A memory 9 is used by the microcomputer 8.

The operation of the conventional optical disk device is as follows. Once the optical disk 1 is inserted into a disk tray (not shown), the optical disk 1 is clamped by a clamping means (also not shown). Then the driver 7, under the control of the servo unit 6, applies a driving current to the spindle motor 11 to rotate the optical disk 1 at a constant or variable speed.

To reproduce signals recorded on the optical disk 1, the optical pickup 2 uses a laser diode (LD) to form a laser beam spot on the recorded layer of optical disk 2. The laser beam is reflected to photo diodes (PD) and converted to electrical signals. The R/F unit 3 takes in these electrical signals and extracts the recorded binary signals. The digital signal processing unit 4 restores the extracted binary signals into digitally modulated data, and the decoder 5 demodulates the digital data from the digital signal processing unit 4 into original digital data.

To control tracking, the R/F unit 3 also generates servo error signals, including a tracking error signal, based on the converted electrical signals from the optical pickup 2. Using the tracking error signal, the servo unit 6 generates servo control signals, which is then outputted to the driver 7. The driver 7 applies electric currents to an actuator to control the movement of an object lens to follow a target track on the optical disk 1.

However, under such tracking control system, the center of the object lens may deviate from an optical axis of the target track. For example, as shown in FIG. 2A, the object lens may deviate to a small extent from the optical axis. On the other hand, the object lens may deviate greatly to the maximum allowable swing limit, as shown in FIG. 2B.

If the deviation approaches the maximum allowable swing limit, then as shown in FIG. 2C, the servo unit 6 detects such critical deviation from the magnitude of the tracking error signal and drives the sled motor 10 to move the optical pickup 2 to correct the deviation. The optical pickup 2 is moved until the magnitude of the tracking error signal is reduced to zero or within a predetermined small range as shown in FIG. 2D.

While the optical pickup 2 slides to the right as shown in FIG. 2C, the actuator enclosing the object lens is also swung to the left by tracking control of the servo unit 6, so that the center of the object lens coincides with the optical axis. When the center of the object lens so coincides, then the object lens is stabilized.

However, if an excessive load is applied to the sled motor 10 or if the driving characteristics of the sled motor 10 are not within acceptable load range, the reproduction may be unreliable, tracking may be difficult to control, and data reading may fail.

To compensate, an entire gain of the slide servo could be increased. But the ability to track and reproduce data from an eccentric disk would be compromised.

Also if an excessive load is applied to the sled motor 10 or if the driving characteristics of the sled motor 10 is not uniform within acceptable load range, the object lens deviation may not be corrected quickly enough. This may cause an over-shifting of the object lens or the object lens may oscillate freely. These are fatal errors that will halt the device operation.

SUMMARY OF THE INVENTION

It is an object of the present invention to provide a servo control method and apparatus capable of detecting a reproduction speed and amount of deviation of an object lens from an optical axis, and compensating to return the object lens to the optical axis even if a heavy load is applied to the driving mechanism.

It is another object of the present invention to provide a servo control method and apparatus capable of maintaining the center of an object lens around the optical axis within a predetermined range. This predetermined range is narrower than a maximum movable range of the object lens.

A servo control method of an optical disk device according to the present invention detects a magnitude of deviation of an object lens from an optical axis of an optical track based on a deviation error signal in normal disk reproduction mode; checks whether the deviation is out of a predetermined range which is narrower than a maximum movable range of the object lens, adjusts a gain for amplifying the deviation error signal, and, if the detected magnitude is out of the predetermined range, applies the deviation error signal amplified by the adjusted gain to a motor for sliding an optical pickup, so that the object lens returns to the optical axis.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENTS

A preferred embodiment of the present invention will be described with reference to the accompanying drawings.

Figure 1:
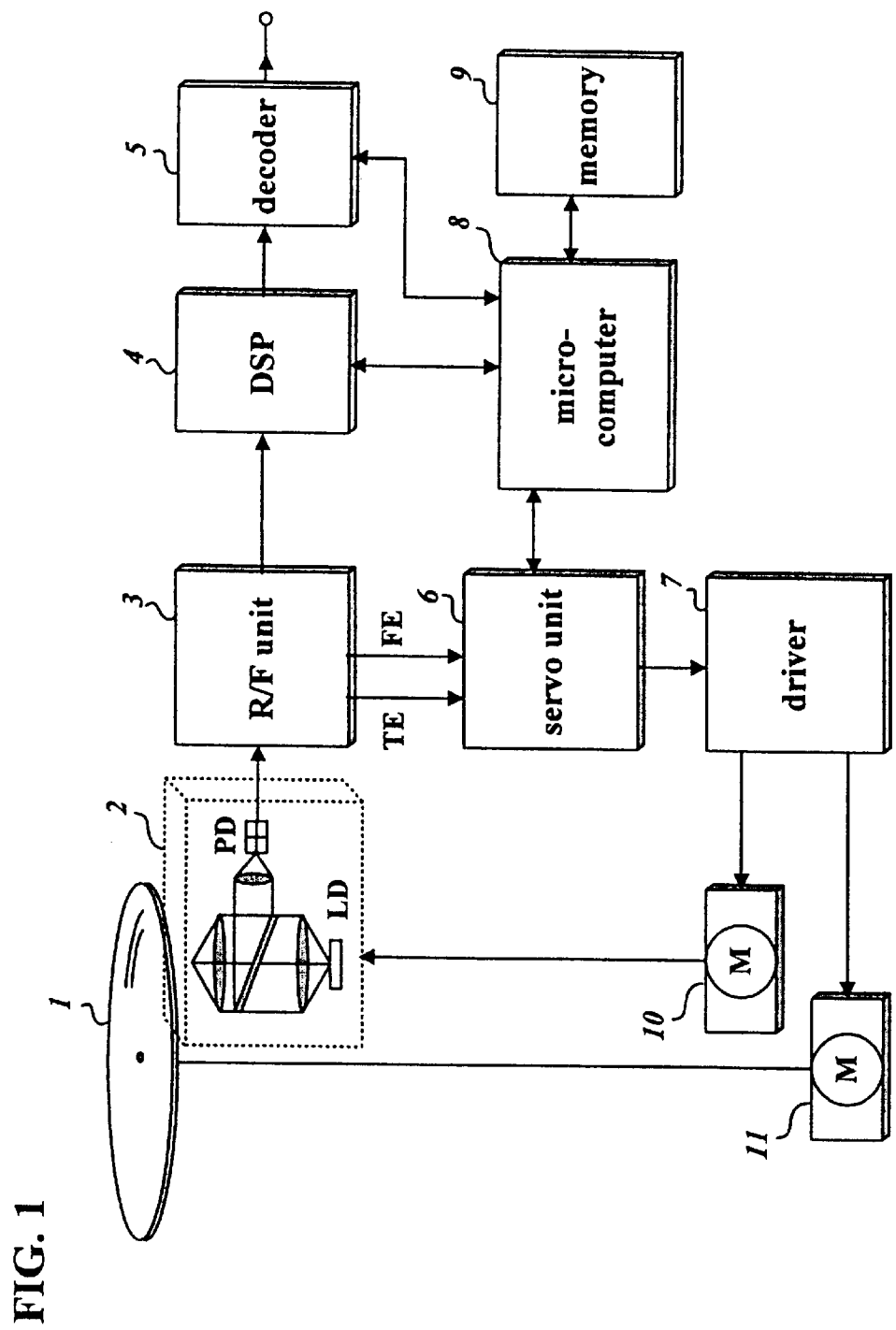
FIG. 1 is a block diagram of a conventional optical disk device.
Figures 2A, 2B, 2C:
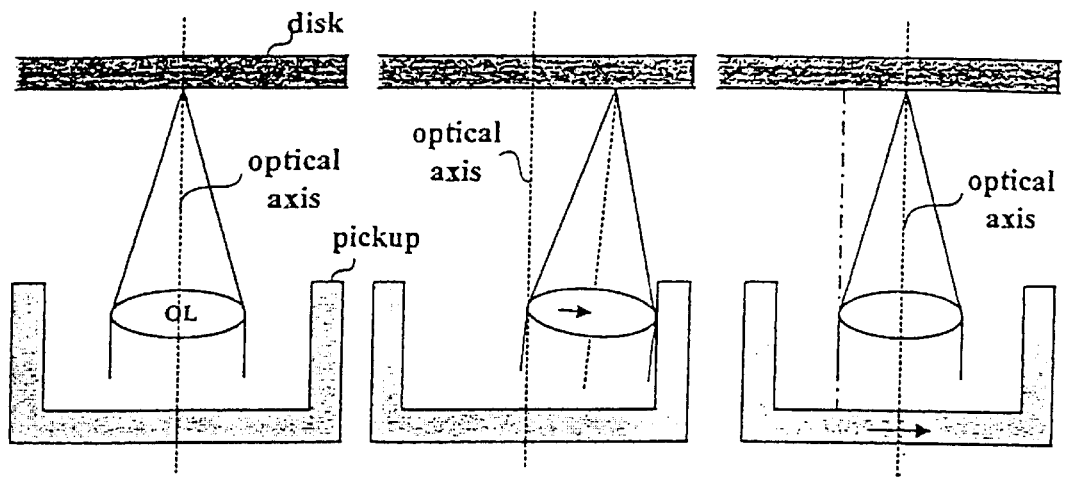
FIGS. 2A–2D show examples of relative arrangements between an optical pickup and an object lens installed therein, and deviation error signal corresponding to each arrangement.
Figure 2D:
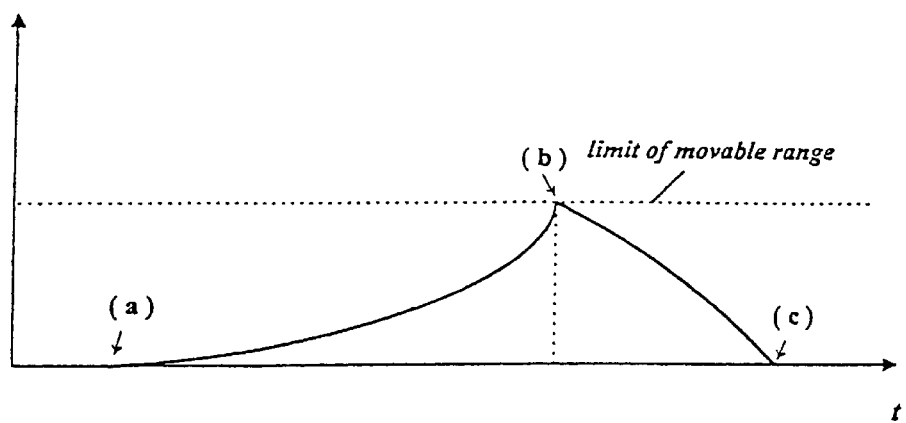
Figure 3:
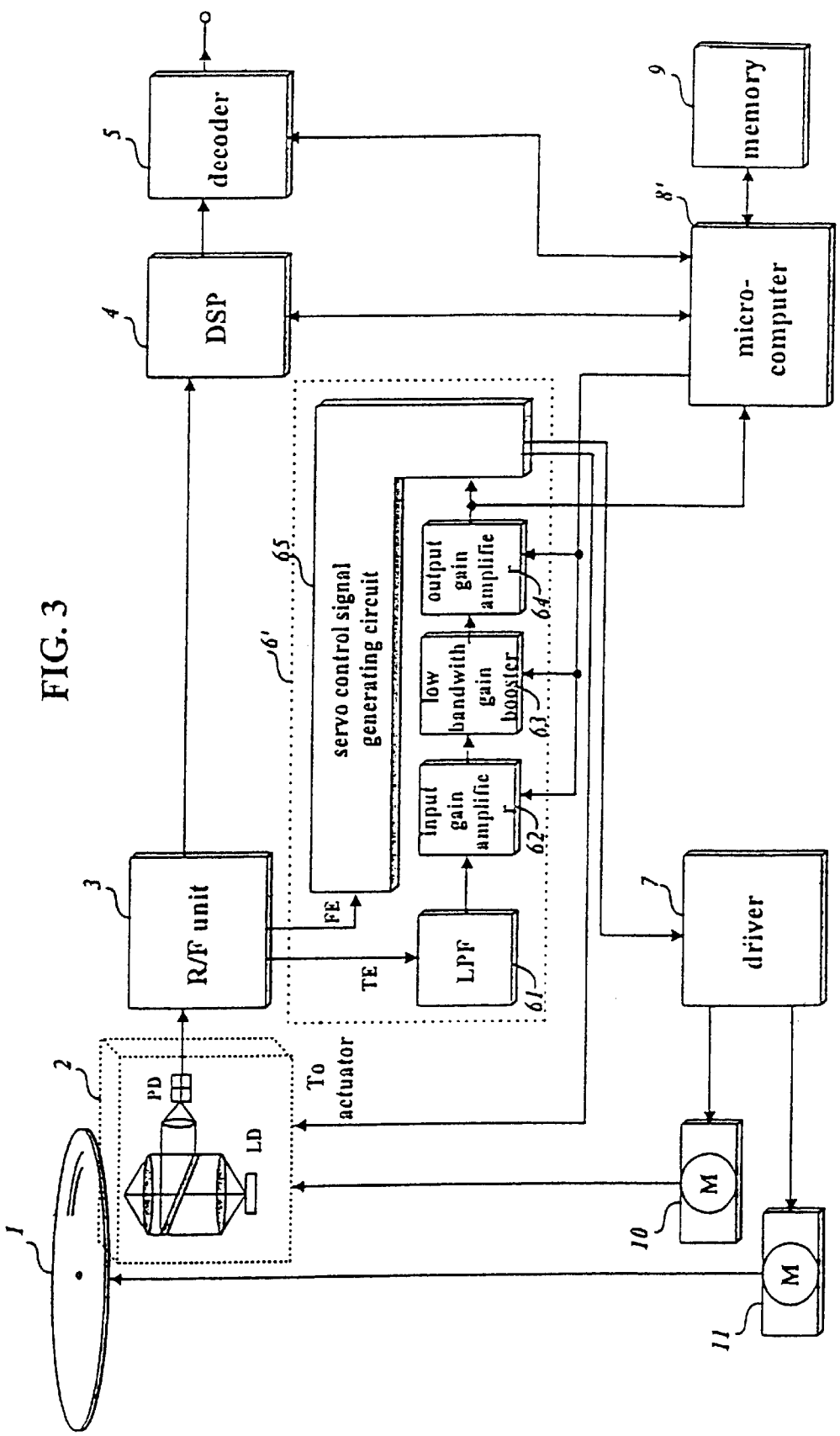
FIG. 3 depicts a block diagram of a preferred embodiment of an optical disk device according to the present invention.

FIG. 3 describes a block diagram of an optical disk device according to an embodiment of the present invention. The signal reproduction is accomplished in a manner much like the conventional device described in FIG. 1. Namely, the device includes an optical pickup 2 to reproduce recorded signals from an optical disk 1; an R/F unit 3 to combine signals reproduced by the optical pickup 2 and output binary signals; a digital signal processing unit 4 to process the binary signals received from the R/F unit 3 to retrieve digital data; and a decoder 5 to decode the retrieved digital data into original data.

The optical device also includes a sled motor 10 to slide the optical pickup 2 across tracks of the optical disk 1 and a spindle motor 11 to rotate the optical disk 1. Both motors are driven under the control of the driver 7.

The tracking of the optical disk is accomplished through an R/F unit 3, which outputs servo error signals (tracking and focusing error signals) in addition to the binary signals; a servo unit 6' which generates servo control signals outputted to the driver 7; and the driver 7 controls the motors as noted above.

The entire operation is supervised by a microcomputer 8' that can access a memory 9.

The servo unit 6' includes a low pass filter (LPF) 61, an input gain amplifier 62, a low bandwidth gain booster 63, output gain amplifier 64, and a servo control signal generating circuitry 65. The LPF 61 extracts a lowband signal (referred to as the deviation error signal) from the tracking error signal. The input gain amplifier 62 amplifies the deviation error signal by a set gain constant, the low bandwidth gain booster 63 amplifies a DC component of the deviation error signal, and the output gain amplifier 64 amplifies the deviation error signal across the whole bandwidth. Finally, the servo control signal generating circuitry 65 outputs final servo control signals to the driver 7.

Figure 4:
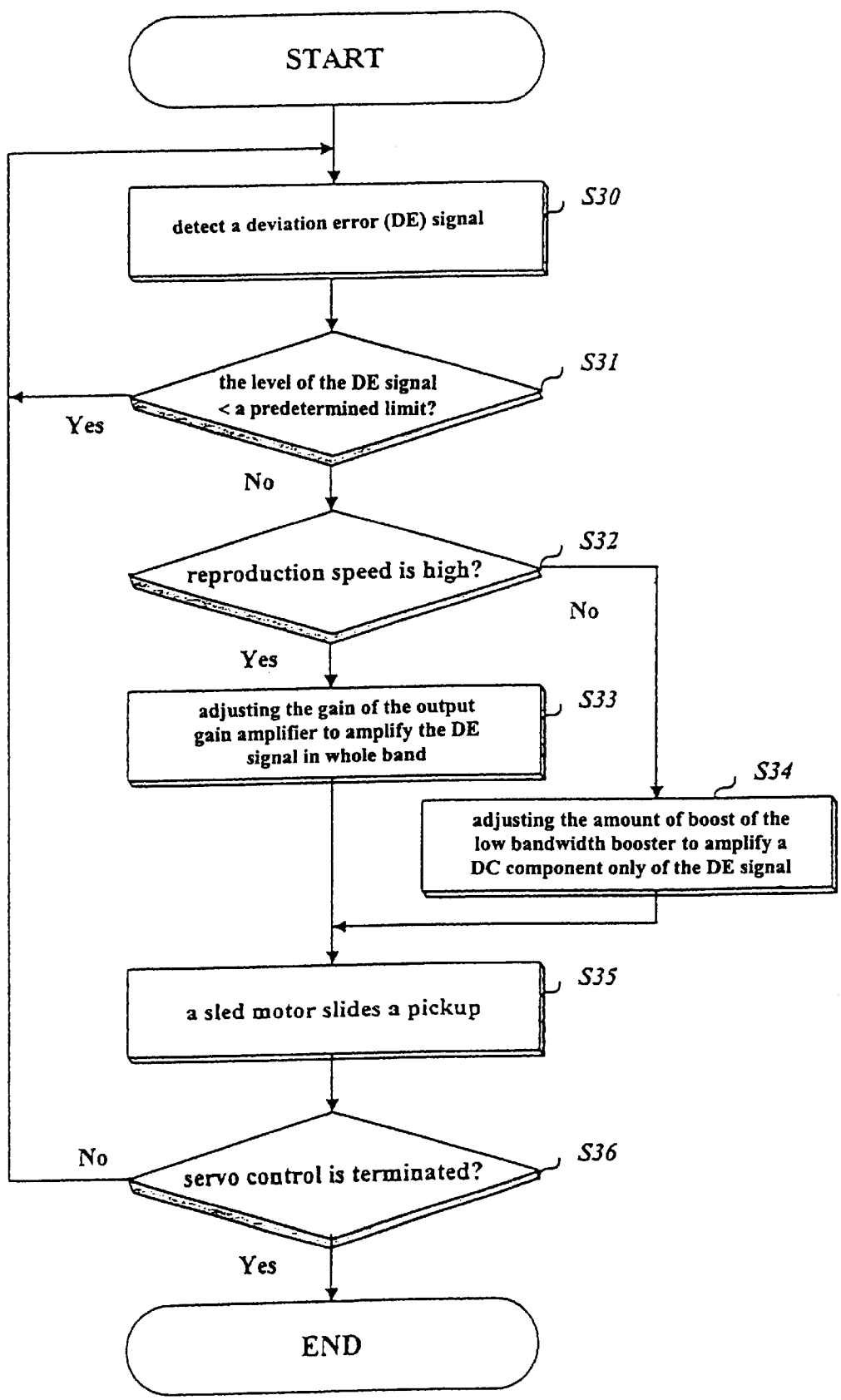
FIG. 4 shows a flow diagram of a pickup sliding method according to an embodiment of the present invention.

FIG. 4 shows a flow diagram of a pickup sliding method according to the embodiment of the present invention. The method of FIG. 4 is explained with reference to FIG. 3.

When reproducing recorded data from optical disk 1, the servo unit 6' outputs ordinary tracking control signals so that the center of the object lens is positioned at a current track by the driver 7 applying tracking control signal to an actuator.

However, the object lens may deviate from the optical axis arbitrarily. When such deviation occurs, the tracking error signal proportional to the deviation is inputted to the LPF 61, the input gain amplifier 62, the low bandwidth gain booster 63, and the output gain amplifier 64 in succession. The final deviation error signal processed by the above elements 61 to 64 is then applied to the microcomputer 8'.

The microcomputer 8' converts the applied deviation error signal into corresponding digital data and detects the amount of deviation of the object lens from the optical axis based on the digital data (S30).

If the deviation is within a predetermined range, the range being narrower than a maximum allowable range for the actuator to swing (S31), then flow returns to step S30 where the deviation is again detected. The predetermined range is preset to the microcomputer 8' taking into account the load to be applied to the sled motor 10 and the driving characteristics of the sled motor 10.

If the deviation is beyond the predetermined range (S31), the microcomputer 8' compensates by controlling the optical pickup 2 to slide so that the object lens again approaches the optical axis.

When it is determined that compensation is needed, the microcomputer 8' detects the current reproduction speed, i.e. the rotational rate of the optical disk 1, based on the driving voltage applied to the driver 7 through the servo unit 6'. If the rotational rate is high, influences caused by external conditions, such as the disk's eccentricity, can be ignored. On the other hand, the external influences cannot be ignored if the rotational rate is low.

If the current reproduction speed is high (S32), because the external influences can be ignored, the microcomputer 8' adjusts the gain of the output gain amplifier 64 to amplify the deviation error signal within whole frequency band (S33) as if the deviation is equal to or greater than the maximum allowable range. The servo signal generating circuitry 65 generates the servo control signals for the sled motor 10 to slide the optical pickup 2 and reduce the deviation (S35).

If the current reproduction speed is low, the microcomputer 8' causes only the DC component of the deviation error signal to be adjusted. The DC component of the error level is adjusted by the microcomputer 8' adjusting the boost of the low bandwidth gain booster 63 (S34). The amplified DC component also induces the servo control signal generating circuitry 65 to slide the pickup 2 (S35).

In other words, the microcomputer 8' indirectly causes the servo unit 6' to adjust the servo control signals being applied to the driver 7 based on the current reproduction speed and taking into account the external effects caused from disk eccentricity, disk defect, etc.

Figure 5A:
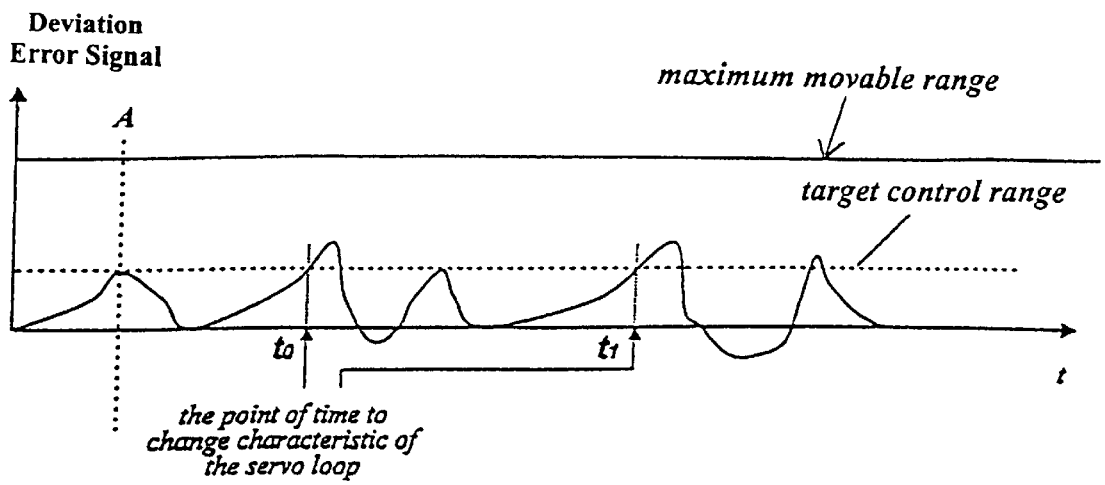
FIGS. 5A and 5B depict graph examples of the deviation error signal generated when the pickup sliding method according to an embodiment of the present invention is applied and not applied, respectively.
Figure 5B:
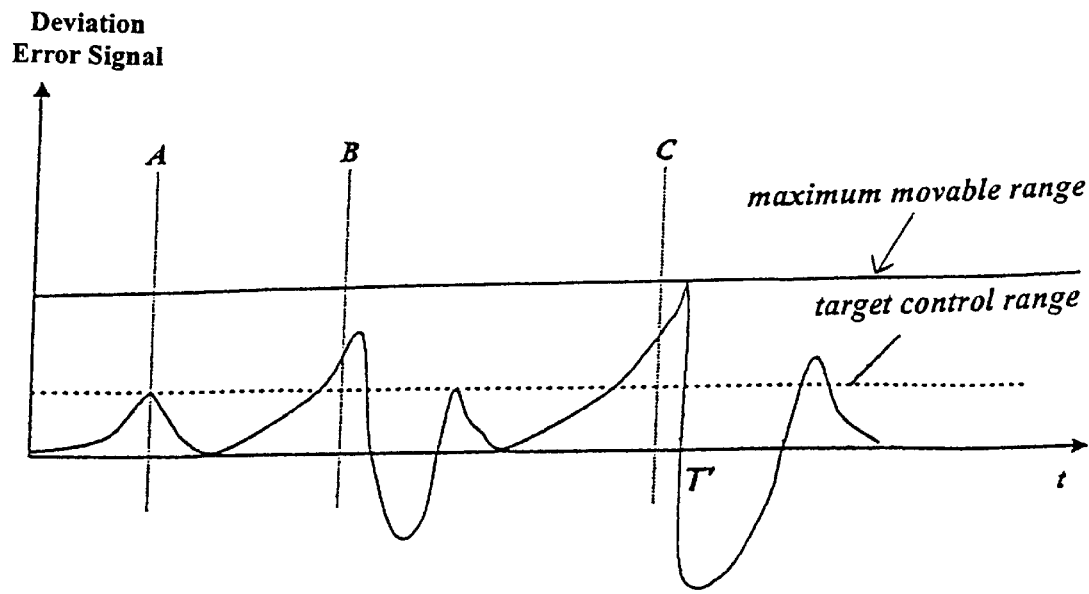

FIG. 5A depicts a graph example of the deviation error signal generated when the above-explained method is applied and FIG. 5B shows an example of the deviation error signal generated when a conventional sliding control method is applied.

Three cases are depicted in FIG. 5B. The first case, marked 'A', depicts a situation where the driving characteristics of the sled motor 10 are uniform and the deviation of the object lens is corrected by only driving the sled motor 10 without changing the servo loop characteristics, e.g., those of the amplifiers 63 and 64. As can be seen, the corrective action is adequate and the object lens is returned to the optical axis.

The second case, marked 'B', depicts a situation where the sled motor 10 is not driven until the object lens comes close to the limit of the maximum movable range. This is beyond the target control range, and also the load characteristics may be different. In this situation, an over-shifting of the object lens occurs due to the abrupt sliding of the optical pickup 2. Thus the quality of the reproduction deteriorates.

The last case, marked 'C', depicts a situation where the disk is defective, such as having scratches or being more eccentric than normal. Like situation 'B', the object lens is beyond the target control range. In this 'C' situation, entire track or tracks may be skipped at time 'T' due to the defects of the disk.

However, as shown in FIG. 5A, in the present invention, the object lens never reaches the limit of the maximum movable range. This is because the slide gain is continuously increased or decreased by changing the characteristics of the servo loop, e.g., amplifiers 63 and/or 64, when the object lens crosses the predetermined target range (t0 and t1 points in FIG. 5A).

As mentioned above, the characteristics of the servo loop are adjusted partially or wholly based on the current reproduction speed. That is, if the rotational rate of the optical disk 1 is high so that the external influences, such as disk eccentricity, are slight, the entire bandwidth of the deviation error signal is increased to adjust the overall characteristics. However, if the rotational rate is low and the external influences cannot be ignored, only the gain on the DC component only is increased, i.e., the loop characteristics is adjusted only partially.

In the present invention, the sled motor is driven to return the object lens to the optical axis before the object lens approaches its maximum movable range. Therefore, the over-shift or free-oscillation of the object lens is prevented or minimized, and also the external effects caused from disk defect, disk eccentricity, and so forth are minimized.

The invention may be embodied in other specific forms without departing from the sprit or essential characteristics thereof. The present embodiment is therefore to be considered in all respects as illustrative and not restrictive, the scope of the invention being indicated by the appended claims rather than by the above description and all changes which come within the meaning and range of equivalency of the claims are therefore intended to be embraced therein.

What is claimed is:

1. A servo control method of an optical disk device in normal disk reproduction, the method comprising:
   (a) detecting a magnitude of deviation of an objective lens from an optical axis;
   (b) checking whether the detected magnitude of deviation is out of a predetermined range, wherein the predetermined range is narrower than a maximum movable range of the objective lens; and
   (c) adjusting a gain for amplifying a deviation error signal if the deviation is determined to be out of said predetermined range in step (b).

2. The method set forth in claim 1, wherein in step (c), said gain is adjusted differently according to a reproduction speed of said optical disk.

3. The method set forth in claim 2, wherein in step (c), a gain for amplifying a DC component of the deviation error signal is adjusted if the current reproduction speed is low.

4. The method set forth in claim 2, wherein in step (c), a gain for amplifying all frequency components of the deviation error signal is adjusted if the current reproduction speed is high.

5. A servo control method of an optical disk device, the method comprising:
   (a) detecting a magnitude of deviation of an objective lens from an optical axis;
   (b) checking whether the deviation is out of a predetermined range, wherein the predetermined range is narrower than a maximum movable range of the objective lens; and
   (c) sliding an optical pickup to correct the deviation if the deviation is determined to be out of said predetermined range in step (b) wherein in step (c), the slide of the optical pickup occurs through adjusting a gain for amplifying a deviation error signal.

6. The method set forth in claim 5, wherein step (c) further comprises applying the amplified deviation error signal to a motor for moving the optical pickup.

7. The method set forth in claim 6, wherein in step (c), said gain is adjusted differently according to a current reproduction speed of said optical disk.

8. The method set forth in claim 7, wherein in step (c), a DC gain for amplifying a DC component of the deviation error signal is adjusted if the current reproduction speed is low.

9. The method set forth in claim 7, wherein in step (c), a gain for amplifying all frequency components of the deviation error signal is adjusted if the current reproduction speed is high.

10. A servo-controlling apparatus of an optical disk device, the apparatus comprising:
    a detector detecting a magnitude of deviation of an objective lens from an optical axis based on a deviation error signal;
    an amplifier amplifying the deviation error signal;
    a driver driving a sled motor based on the amplified deviation error signal; and
    a controller checking whether the magnitude detected by the detector is out of a predetermined range, and adjusting the gain of the amplifier based on the checked result, wherein the predetermined range is narrower than a maximum movable range of the objective lens.

11. The apparatus set forth in claim 10, wherein the detector is a microcomputer.

12. The apparatus set forth in claim 10, wherein the amplifier comprises:
    a low pass filter extracting the deviation error signal from a tracking error signal;
    an input amplifier amplifying the deviation error signal by a predetermined constant;
    a DC amplifier amplifying a DC component of the amplified deviation error signal from the input amplifier; and
    an output amplifier amplifying the whole signal from the DC amplifier.

13. The apparatus set forth in claim 10, wherein the controller further comprises a digitizer converting the amplified signal from the amplifier into digital data.

14. The apparatus set forth in claim 10, wherein the controller detects a current reproduction speed and adjusts the gain of the amplifier differently according to the detected reproduction speed if the objective lens deviation is out of the predetermined range.

15. A method to control deviation of an objective lens of an optical disk device, the method comprising:
    (a) detecting a magnitude of deviation of an objective lens from an optical axis of a track of an optical disk;
    (b) determining whether said magnitude of deviation is within a predetermined range;
    (c) selectively adjusting a gain to amplify a deviation error signal based on a reproduction rotational rate of an optical disk and outputting a servo control signal if said deviation is determined to be out of said predetermined range; and
    (d) controlling movement of an optical pickup based on said servo control signal.

16. The method of claim 15, wherein in step (b), said predetermined range is narrower than a maximum movable range of said objective lens.

17. The method of claim 15, wherein in step (c), adjusting a DC component of said deviation error signal if said rotational rate is low and adjusting an entire bandwidth of said deviation error signal if said rotational rate is high.

18. An apparatus to control deviation of an objective lens of an optical disk device, comprising:

a spindle motor to rotate an optical disk;

an optical pickup unit, including a slide, to track and reproduce data from said optical disk;

a sled motor moving said slide of said optical pickup unit;

an R/F unit outputting a tracking error signal and a focusing error signal based on signals from said optical pickup unit;

a microcomputer detecting the magnitude of deviation of said objective lens from an optical axis of said track and providing a gain adjustment signal based on a rotational rate of said optical disk if said deviation is beyond a predetermined range;

a servo unit selectively adjusting a gain to amplify a deviation error signal of said tracking error signal based on said gain adjustment signal and outputting a servo control signal; and a driver outputting driving currents to said sled motor and said spindle motor based on said servo control signal.

19. The apparatus of claim 18, wherein said predetermined range is narrower than a maximum movable range of said objective lens.

20. The apparatus of claim 18, wherein if said rotational rate of said optical disk is high, said microcomputer outputs said gain adjustment signal to adjust said gain of said servo unit for an entire bandwidth of said deviation error signal and if said rotational rate is low, said microcomputer outputs said gain adjustment signal to adjust a DC component of said deviation error signal.

21. The apparatus of claim 18, wherein said servo unit comprises:

a low pass filter extracting said deviation error signal from said tracking error signal;

a low bandwidth gain booster amplifying a DC component of said deviation error signal;

an output gain amplifier amplifying an entire bandwidth of said deviation error signal; and a servo control signal generating circuit outputting said servo control signals based on said focusing error signal and an output from said output gain amplifier.

22. The apparatus of claim 21, wherein a gain of said low bandwidth gain booster is adjusted if said rotational rate of said optical disk is determined to be low and a gain of said output gain amplifier is adjusted if said rotational rate of said optical disk is determined to be high.

* * * * *